United States Patent
Mueller et al.

(10) Patent No.: US 6,770,700 B2
(45) Date of Patent: Aug. 3, 2004

(54) CROSSLINKABLE COMPOSITIONS BASED ON ORGANOSILICON COMPOUNDS

(75) Inventors: Johann Mueller, Konzell (DE); Gerhard Madl, Burghausen (DE)

(73) Assignee: Wacker-Chemie GmbH, Munich (DE)

( * ) Notice: Subject to any disclaimer, the term of this patent is extended or adjusted under 35 U.S.C. 154(b) by 0 days.

(21) Appl. No.: 10/306,121

(22) Filed: Nov. 27, 2002

(65) Prior Publication Data

US 2003/0176560 A1 Sep. 18, 2003

(30) Foreign Application Priority Data

Mar. 14, 2002 (DE) .......... 102 11 314

(51) Int. Cl.⁷ .............. C08K 3/40
(52) U.S. Cl. .......... 524/494; 524/588; 524/847
(58) Field of Search .............. 524/494, 588, 524/847

(56) References Cited

U.S. PATENT DOCUMENTS

| | | | |
|---|---|---|---|
| 4,076,684 A | | 2/1978 | Wohlfarth et al. |
| 4,840,666 A | * | 6/1989 | Schmidt et al. .......... 106/14.05 |
| 5,268,441 A | | 12/1993 | Barthel et al. |
| 5,334,688 A | * | 8/1994 | Loo .............. 528/15 |
| 5,432,007 A | * | 7/1995 | Naito .............. 428/447 |
| 5,521,245 A | * | 5/1996 | Hirabayashi et al. ....... 524/493 |
| 5,767,185 A | | 6/1998 | Reo |

FOREIGN PATENT DOCUMENTS

| | | |
|---|---|---|
| DE | 25 56 420 | 6/1977 |
| DE | 43 36 345 A1 | 4/1995 |
| DE | 44 05 245 A1 | 8/1995 |
| DE | 44 01 606 A1 | 7/1996 |
| EP | 0 841 377 B1 | 4/2000 |
| WO | WO 96 30203 | 10/1996 |

OTHER PUBLICATIONS

Technical Information for Glass Flakes GF 400M and GF 003, 1991.*
English Derwent Abstract AN 1995–156740 [21]Corrresponding To DE 43 36 345.
English Derwent Abstract AN 1998–262492 [24]Corresponding To DE 44 05 245.
English Derwent Abstract AN 1995–264261 [35]Corresponding To DE 44 01 606.

* cited by examiner

*Primary Examiner*—Margaret G. Moore
(74) *Attorney, Agent, or Firm*—Brooks Kushman P.C.

(57) ABSTRACT

Crosslinkable compositions based on organosilicon compounds and moldings produced therefrom further contain glass flakes having a thickness of from 0.1 to 20 μm, a length of from 1 to 5000 μm and a width of from 1 to 5000 μm, and a width or length to thickness ratio in the range from 10:1 to 2000:1. The compositions, when cured, exhibit excellent tear resistance, have surfaces exhibiting a low coefficient of friction, and a relatively low calorific value.

20 Claims, No Drawings

CROSSLINKABLE COMPOSITIONS BASED ON ORGANOSILICON COMPOUNDS

BACKGROUND OF THE INVENTION

1. Field of the Invention

The invention relates to crosslinkable compositions comprising organosilicon compounds and glass flakes, and to moldings produced therefrom.

2. Background Art

A large number of crosslinkable compositions based on organosilicon compounds with various types of fillers and additives are known. In this respect, reference may be made, for example, to EP-B-841 377, which describes, in particular, organopolysiloxane compositions which, after crosslinking, provide vulcanizates having a touch-dry surface. Furthermore, U.S. Pat. No. 5,767,185 discloses moldable silicone rubber compositions which comprise glass particles as fillers.

SUMMARY OF THE INVENTION

The present invention pertains to crosslinkable silicone compositions which include glass flakes. It has been surprisingly discovered that use of glass flakes in lieu of or in addition to conventional fillers improves physical properties of the cured compositions, particularly tear strength. The products may have a dry-touch surface and may also exhibit a low coefficient of friction.

DESCRIPTION OF THE PREFERRED EMBODIMENTS

The invention thus relates to crosslinkable compositions based on organosilicon compounds which contain glass flakes having a thickness of from 0.1 to 20 $\mu$m, a length of from 1 to 5000 $\mu$m and a width of from 1 to 5000 $\mu$m.

The glass flakes present in the compositions can consist of any desired types of glass, preferably inorganic glass. Examples of types of glass of which the glass flakes are composed include industrial glass, quartz glass, borosilicate glass, flat glass, pressed glass, bottle glass, table glass, mirror glass and ceramic glasses, particular preference being given to industrial glass, flat glass, borosilicate glass and ceramic glasses, especially flat glass, industrial glass and borosilicate glass.

The glass flakes employed in the invention may be untreated or may be surface-treated with functional silanes. Examples of functional silanes with which the glass flakes may have been surface-treated include aminopropyltrialkoxysilanes, aminoethylaminopropyltrialkoxysilanes, vinyltrialkoxysilanes, vinyltriacetoxysilanes, glycidoxypropyltrialkoxysilanes and methacryloxypropyltrialkoxysilanes.

Furthermore, the glass flakes employed in the invention may have been metal vapor-coated or provided with a surface coating of a purely organic or purely inorganic nature.

The glass flakes preferably have a thickness of from 0.1 to 10 $\mu$m, more preferably from 0.5 to 10 $\mu$m, and most preferably from 1 to 7 $\mu$m; preferably have a length of from 1 to 3000 $\mu$m, more preferably from 1 to 1500 $\mu$m, and most preferably from 1 to 500 $\mu$m; and preferably have a width of from 1 to 3000 $\mu$m, more preferably from 1 to 1500 $\mu$m, and most preferably from 1 to 500 $\mu$m. The width or length to thickness ratio is preferably in the range from 10:1 to 2000:1, more preferably from 20:1 to 1500:1, and most preferably from 30:1 to 1000:1. It is preferable that both the width and length are numerically greater than the thickness. Preferably, the width to length or length to width ratio is less than 100.

The glass flakes can have very different geometries, such as, for example, planar platelet-shaped, wavy, rolled or twisted, but are preferably planar. Such glass flakes are commercially available, and can be purchased, for example, from Glass Flake Ltd., Leeds, GB. As a consequence of production, the glass flakes may be in the form of a mixture with other glass particles, such as powders or fibers. However, at least 80% by weight of all particles are preferably in flake form and not in powder or fiber form.

The compositions according to the invention preferably comprise glass flakes in amounts of from 1 to 80 parts by weight, more preferably from 1 to 70 parts by weight, and most preferably from 2 to 60 parts by weight, in each case based on 100 parts by weight of crosslinkable composition. Compositions having glass flake contents of 2 to about 20 parts by weight may be advantageous for numerous applications.

The curable compositions can be any desired type of organosilicon compound-based composition which can be crosslinked to give elastomers, for example, one-component or two-component organopolysiloxane compositions which can be vulcanized at room temperature (so-called RTV compositions) or elevated temperature (so-called HTV compositions), it being possible for the crosslinking to be carried out by condensation, addition of Si-bound hydrogen onto aliphatic multiple bonds, or peroxidically through the formation of free radicals. The crosslinkable compositions can be free from fillers, but may also contain active or inactive fillers.

The type and amount of the components usually used in compositions of this type, other than glass flakes, are already known. In this respect, reference may be made, for example, to U.S. Pat. No. 5,268,441, DE-A 44 01 606, DE-A 44 05 245 and DE-A 43 36 345.

The glass flakes employed in accordance with the invention can be mixed as desired with the other components of the crosslinkable compositions. They can be incorporated as a final step into the otherwise finished silicone rubber formulation or incorporated during preparation of the silicone rubber mixture. However, the glass flakes can also be pre-mixed into one or more of the components employed.

The mixing process for the preparation of the compositions is preferably simple mechanical combination. Depending on the consistency and viscosity of the base medium, the mixing process can be carried out in roll mills, compounders, dissolvers, Z mixers, ball mills or simple stirrers. Merely for the sake of simplicity, the mixing process is preferably carried out at ambient pressure. However, mixing under reduced or elevated pressure is also possible. Likewise for the sake of simplicity, the mixing process is preferably carried out at ambient temperature, although it is also possible to carry out the mixing at elevated temperature or with cooling.

The inventive compositions have the advantage of being simple to prepare and having good processing properties. Furthermore, the compositions have the advantage that vulcanizates which have a touch-dry surface with a low coefficient of friction can be prepared therefrom.

The compositions can be crosslinked under the same conditions as previously known crosslinkable compositions based on organosilicon compounds. Preparation processes which can be used include all common processes for the processing of silicone rubbers. Non-limiting examples thereof are calendering, compression molding, injection molding, extrusion, and casting.

The present invention furthermore relates to moldings produced by crosslinking the inventive compositions.

The compositions can also be used for coating textile sheet-like structures such as woven fabrics, knitted fabrics, laid fabrics, nonwoven fabrics, felts, etc. The coating can be applied by the knife-coating method, dipping method, extrusion method or spraying method. In addition, all types of roll coatings, such as engraved rolls, slop padding or application via multiroll systems, as well as screen printing are possible.

The coated woven fabrics can be employed in all cases where reduced surface friction, high transparency, reduced thermal value and high tear propagation strength and tear strength are advantageous. Examples are hang gliders, parachutes, hot-air balloons, leisure clothing, and leisure articles such as tents or rucksacks, sails or airbags. In the industrial sector, the coated woven fabrics are advantageously employed for conveyor belts, compensators, awnings, textile structures or in insulation applications. Thus, the present invention furthermore relates to textile or non-textile sheet-like structures which have been coated with the compositions of the invention.

Crosslinking of the inventive compositions provides vulcanizates which advantageously have a surface with a reduced coefficient of friction without after-treatment. The vulcanizates have the further advantage of exhibiting improved tear propagation strength and tear strength and at the same time being transparent or translucent. The vulcanizates also have a reduced calorific value.

The organosilicon compound-based compositions employed can be compositions which have a long shelf life in the absence of water, but can be crosslinked in the presence of water at room temperature by condensation to give elastomers. The condensation-crosslinkable compositions preferably comprise (a) an organosilicon compound containing groups which are capable of undergoing condensation, (b) an organosilicon compound containing at least three Si-bound hydrolyzable radicals, (c) a condensation catalyst, (d) glass flakes having a thickness of from 0.1 to 20 μm, a length of from 1 to 5000 μm and a width of from 1 to 5000 μm, and optionally, (e) further substances.

The condensation-crosslinkable compositions according to the invention can be one-component compositions or two-component compositions, where in the latter case a single component does not simultaneously comprise constituents (a), (b) and (c).

The organosilicon compound (a) containing condensable groups is preferably one of the general formula $$HO(SiR_2O)_mSiR_2OH \quad (I)$$

where R are identical or different, optionally substituted, monovalent hydrocarbon radicals, and m is an integer having a value of at least 20, preferably a number from 50 to 100,000.

Although not shown by the formula (I), other siloxane units, such as those of the formulae $RSiO_{3/2}$, $R_3SiO_{1/2}$, and $SiO_{4/2}$, where R is in each case as defined above, may be present in addition to the diorganosiloxane units ($SiR_2O$).

However, the amount of such siloxane units other than diorganosiloxane units is preferably at most 10 mol percent, in particular at most 1 mol percent, in each case based on the weight of the organopolysiloxanes (a).

The organosilicon compounds (a) preferably have a viscosity of from 100 to 500,000 mm$^2$/s at 25° C.

Examples of radicals R are alkyl radicals such as the methyl, ethyl, n-propyl, isopropyl, 1-n-butyl, 2-n-butyl, isobutyl, tert-butyl, n-pentyl, isopentyl, neopentyl and tert-pentyl radicals; hexyl radicals such as the n-hexyl radical; heptyl radicals such as the n-heptyl radical; octyl radicals such as the n-octyl radical, and iso-octyl radicals such as the 2,2,4-trimethylpentyl radical; nonyl radicals such as the n-nonyl radical; decyl radicals such as the n-decyl radical; dodecyl radicals such as the n-dodecyl radical; octadecyl radicals such as the n-octadecyl radical; cycloalkyl radicals, such as the cyclopentyl, cyclohexyl, cycloheptyl and methylcyclohexyl radicals; alkenyl radicals such as the vinyl, 1-propenyl and 2-propenyl radicals; aryl radicals such as the phenyl, naphthyl, anthryl and phenanthryl radicals; alkaryl radicals such as the o-, m- and p-tolyl radicals; xylyl radicals and ethylphenyl radicals; and aralkyl radicals such as the benzyl radical and the α- and β-phenylethyl radicals. The radical R is preferably a radical having from 1 to 18 carbon atoms, more preferably the propyl, hexyl, and octyl radicals, and most preferably the methyl radical.

The organosilicon compounds having at least three Si-bound hydrolyzable groups (b) are preferably silanes of the general formula $$R^1{}_{4-n}SiZ_n \quad (II)$$

and/or partial hydrolyzates thereof having from 2 to 10 silicon atoms per molecule, where $R^1$ may be identical or different and is as defined for R, n is 3 or 4, and Z denotes identical or different hydrolyzable groups such as the amino, amido, aminoxy and oximo groups, for example —ON=C(CH$_3$)(C$_2$H$_5$), an alkoxy group such as the methoxy or ethoxy group, an alkoxyalkoxy group such as CH$_3$—O—C$_2$H$_5$—O—, an alkenyloxy group such as H$_2$C=(CH$_3$)CO—, or an acyloxy group such as the acetoxy group. The hydrolyzable group Z is preferably an ethoxy, oximo or acetoxy group. The radical $R^1$ is preferably a propyl, hexyl, octyl, vinyl or methyl radical, more preferably a vinyl or methyl radical.

The organosilicon compound (b) is preferably employed in an amount of from 2 to 10 parts by weight per 100 parts by weight of organosilicon compound (a).

The condensation catalyst (c) is preferably an organometallic compound such as a carboxylic acid salt, an alkoxide, or a halide of the metals Pb, Zn, Zr, Ti, Sb, Fe, Cd, Sn, Ba, Ca or Mn, such as tin(II) octanoate, dibutyltin dilaurate, octyltin triacetate, dioctyltin dioctanoate, dioctyltin diacetate, didecyltin diacetate, dibutyltin diacetate, dibutyltin dibromide, dioctyltin dilaurate, trioctyltin acetate, titanium alkoxide, and organotitanium compounds having at least one Si—O—Ti bond.

The condensation catalyst (c) is preferably employed in an amount of from 0.1 to 2 parts by weight per 100 parts by weight of organosilicon compound (a).

Glass flakes (d) employed in accordance with the invention are preferably used in an amount of from 2 to 80 parts by weight per 100 parts by weight of the composition which can be crosslinked by a condensation reaction.

To meet requirements of particular applications, further substances (e) can be added to the vulcanizable compositions, with the proviso that the additives (e) are different from component (d). Examples of such further substances (e) are fillers, for example, inactive fillers, substances for improving the surface properties such as adhesion promoters, processing auxiliaries such as, plasticizers, pigments, soluble dyes, fragrances, fungicides, purely organic resins, corrosion inhibitors, oxidation inhibitors, heat stabilizers, solvents, agents for influencing electrical properties such as conductive black, flame-inhibiting substances, light stabilizers and agents for extending skin-formation time. Component (e) preferably comprises fillers, plasticizers and adhesion promoters.

Examples of reinforcing fillers which can be employed as further substances (e) are pyrogenic or precipitated silicic acids having BET surface areas of at least 50 m²/g, as well as furnace black and acetylene black. The silicic acid fillers may have a hydrophilic character or can be hydrophobicized by known methods.

Examples of non-reinforcing fillers which can be employed as further substances (e) and are different from component (d) are quartz flour, diatomaceous earth, calcium silicate, zirconium silicate, zeolites, metal-oxide powders such as aluminum oxide, titanium oxide, iron oxide, and zinc oxide, barium silicate, barium sulfate, calcium carbonate, and gypsum, as well as polymer powders such as polyacrylonitrile powder or polytetrafluoroethylene powder. Furthermore, fibrous components such as glass fibers and plastic fibers can be employed as fillers. The BET surface area of these fillers is preferably less than 50 m²/g.

Examples of plasticizers which can be employed as component (e) are polydimethylsiloxanes which are terminated with trimethylsilyl groups or hydroxyl groups and have a maximum viscosity of 1000 mm²/s at 25° C., and diphenylsilanediol.

Examples of adhesion promoters are aminosilanes, such as aminoethylaminopropyltriethoxysilane, or polysiloxanes containing aminoethylaminopropylsiloxy groups.

Examples of heat stabilizers are transition-metal fatty acid salts, such as iron octanoate, transition-metal silanolates such as iron silanolate, and cerium(IV) compounds.

The compositions according to the invention which can be crosslinked by condensation preferably comprise no further substances besides components (a) to (e).

The individual components employed in the condensation-crosslinkable compositions may comprise either a single type of these components or a mixture of at least two types of these components.

The preparation of the organosilicon compound-based, condensation-crosslinkable compositions can be carried out by known processes, for example by simple mixing of the individual components. Mixing is preferably carried out at room temperature and ingress of water is preferably avoided during this mixing. If desired, however, mixing can also be carried out at elevated temperatures, for example at a temperature in the range from 25 to 80° C.

The usual water content of air is sufficient for crosslinking of the condensation crosslinking compositions according to the invention. If desired, the crosslinking can also be carried out at higher temperatures than room temperature, for example at from 25 to 120° C., or at lower temperatures than room temperature, for example at from −10 to 25° C. The crosslinking can likewise be carried out at water concentrations which exceed the normal water content of air.

The compositions are particularly suitable as sealants for joints and similar cavities with gaps of, for example, from 10 to 40 mm, or as adhesives and putties, for example in window construction, or for the production of protective coatings or for the production of coatings which repel adhesive substances or also for other applications in which it has been possible to employ the previously known compositions which crosslink at room temperature to give elastomers, such as for the insulation of electrical or electronic equipment, for the coating of moldings made from plastic, metals and elastomers, and for the coating of textile sheet-like structures.

The organosilicon compound-based compositions can be those which can be crosslinked by the addition of Si-bound hydrogen onto an aliphatic carbon—carbon multiple bond. The addition-crosslinkable, organosilicon compound-based compositions according to the invention preferably comprise (1) organosilicon compounds which contain SiC-bound radicals having aliphatic carbon—carbon multiple bonds, (2) organosilicon compounds containing Si-bound hydrogen atoms, (3) or, instead of or in addition to one or both of (1) and (2), organosilicon compounds which contain SiC-bound radicals having aliphatic carbon—carbon multiple bonds and Si-bound hydrogen atoms, (4) a catalyst which promotes the addition of Si-bound hydrogen onto an aliphatic multiple bond, (5) glass flakes having a thickness of from 0.1 to 20 μm, a length of from 1 to 5000 μm and a width of from 1 to 5000 μm, and optionally (6) further substances.

If the composition is an addition-crosslinking 2-component silicone rubber composition, the two components of the silicone rubber compositions according to the invention may comprise all constituents in any desired combinations and mixing ratios, with the proviso that a single component does not simultaneously comprise both the catalyst (4) and a crosslinkable combination of constituents (1), (2) and (3). The organosilicon compounds (1) are preferably linear, cyclic or branched siloxanes comprising units of the formula $$R^2_s R^3_t SiO_{(4-s-t)/2} \tag{III}$$

where $R^2$ are identical or different and denotes an SiC-bound, aliphatically unsaturated hydrocarbon radical, $R^3$ are identical or different and denotes an optionally substituted, SiC-bound, aliphatically saturated hydrocarbon radical, s is 0, 1, 2 or 3, preferably 0, 1 or 2, and t is 0, 1, 2 or 3, with the proviso that the sum of s+t is less than or equal to 3, and at least two radicals $R^2$ are present per molecule.

The organosilicon compounds (1) preferably have a mean viscosity of from $10^2$ to $10^6$ mm²/s at 25° C.

The radical $R^2$ is preferably a hydrocarbon radical containing an aliphatic multiple bond and having from 2 to 18 carbon atoms, such as a vinyl, allyl, methallyl, 2-propenyl, 3-butenyl, 4-pentenyl, 5-hexenyl, butadienyl, hexadienyl, cyclopentenyl, cyclopentadienyl, cyclohexenyl, ethynyl, propargyl or 2-propynyl radical, particular preference being given to radicals $R^2$ of this type which have from 2 to 6 carbon atoms, in particular vinyl and allyl radicals.

Examples of radicals $R^3$ are all examples of aliphatically saturated radicals indicated previously for the radical R. The radical $R^3$ is preferably an optionally substituted, aliphatically saturated, monovalent hydrocarbon radical having from 1 to 18 carbon atoms, more preferably having from 1 to 8 carbon atoms, in particular the methyl radical. The organosilicon compounds (1) are most preferably linear organopolysiloxanes having a viscosity of from 200 to $10^5$ mm$^2$/s at 25° C., of the structure $$(ViMe_2SiO_{1/2})(ViMeSiO)_{0-50}(Me_2SiO)_{30-2000}(ViMe_2SiO_{1/2})$$

where Me is the methyl radical and Vi is the vinyl radical.

The organosilicon compounds (2) containing Si-bound hydrogen atoms are preferably linear, cyclic or branched siloxanes comprising units of the formula $$R^4{}_uH_vSiO_{(4-u-v)/2} \qquad (IV)$$

where $R^4$ may be identical or different and is as defined above for $R^3$,
u is 0, 1, 2 or 3, and
v is 0, 1 or 2, preferably 0 or 1, with the proviso that the sum of u+v is less than or equal to 3, and on average at least two Si-bound hydrogen atoms are present per molecule.

The organosilicon compounds (2) preferably have a viscosity of from 10 to 2·10$^4$ mm$^2$/s at 25° C.

Preference is given to the use of an organosilicon compound (2) containing three or more SiH bonds per molecule. On use of a constituent (2) containing only two SiH bonds per molecule, the organosilicon compound (1) preferably contains at least three aliphatic carbon—carbon multiple bonds per molecule. The organosilicon compound (2) is thus preferably employed as crosslinking agent.

The organosilicon compound (2) has a content of Si-bound hydrogen of preferably from 0.002 to 1.7% by weight of hydrogen, more preferably between 0.1 and 1.7% by weight of hydrogen.

The organosilicon compounds (2) are most preferably organopolysiloxanes having a viscosity of from 20 to 1000 mm$^2$/s at 25° C.

The polyorganosiloxane (2) is preferably present in the curable silicone rubber composition in such an amount that the molar ratio between SiH groups and radicals containing an aliphatic carbon—carbon multiple bond in component (1) is from 0.5 to 5, preferably from 1.0 to 3.0.

If organosilicon compounds (3) are employed, they are preferably those comprising units of the formula $$R^3{}_fSiO_{(4-f)/2}, R^3{}_gR^2SiO_{(3-g)/2} \text{ and } R^3{}_hHSiO_{(3-h)/2},$$

where $R^2$ and $R^3$ are as defined above for these radicals,
f is 0, 1, 2 or 3,
g is 0, 1 or 2, and
h is 0, 1 or 2, with the proviso that at least 2 radicals $R^2$ and at least 2 Si-bound hydrogen atoms are present per molecule.

Examples of organosilicon compounds (3) are those comprising $SiO_{4/2}$, $R^3{}_3SiO_{1/2}$, $R^3{}_2R^2SiO_{1/2}$ and $R^3{}_2HSiO_{1/2}$ units, so-called MQ resins, it additionally being possible for these resins to comprise $R^3SiO_{3/2}$ and $R^3{}_2SiO$ units, and linear organopolysiloxanes essentially consisting of $R^3{}_2R^2SiO_{1/2}$, $R^3{}_2SiO$ and $R^3HSiO$ units, where $R^2$ and $R^3$ are as defined above.

The organosilicon compounds (3) preferably have a viscosity of from 0.01 to 500,000 Pa·s, particularly preferably from 0.1 to 100,000 Pa·s, in each case at 25° C., and may be used alone, or together with organosilicon compounds (1) and/or (2).

Constituent (4) which promotes the addition reaction (hydrosilylation) between radicals containing an aliphatic carbon—carbon multiple bond and Si-bound hydrogen can be any hydrosilylation catalyst, many examples of which are currently known.

Examples of hydrosilylation catalysts (4) are metals such as platinum, rhodium, palladium, ruthenium and iridium, preferably platinum, which may optionally be immobilized on finely divided support materials, such as activated carbon, aluminum oxide or silicon dioxide. The catalyst (4) used is preferably platinum or a compound or complex thereof.

The amount of catalyst (4) depends on the crosslinking rate desired, the catalytic activity of the particular compound and on economic considerations. The compositions according to the invention preferably comprise catalysts (4) in such amounts to give a platinum content of from 0.05 to 500 ppm by weight (parts by weight per million parts by weight), more preferably from 0.5 to 100 ppm by weight, and most preferably from 1 to 50 ppm by weight, in each case based on the total weight of the crosslinkable composition.

Glass flakes (5) employed in accordance with the invention are preferably used in an amount of from 2 to 80 parts by weight per 100 parts by weight of the addition-crosslinkable composition.

Besides components (1) to (5), the curable compositions according to the invention may also comprise all further substances (6) which have hitherto also been employed for the preparation of addition-crosslinkable compositions, with the proviso that the further substances (6) are different from component (5).

Examples of further substances (6) are reinforcing fillers, non-reinforcing fillers, resinous polyorganosiloxanes which are different from the siloxanes (1), (2) and (3), dispersion auxiliaries, solvents, adhesion promoters, pigments, dyes, plasticizers, organic polymers, heat stabilizers, inhibitors and stabilizers.

Examples of customary inhibitors which can be employed as component (6) are acetylenic alcohols, such as 1-ethynyl-1-cyclohexanol, 2-methyl-3-butyn-2-ol and 3,5-dimethyl-1-hexyn-3-ol, 3-methyl-1-dodecyn-3-ol, polymethylvinylcyclsiloxanes, such as 1,3,5,7-tetravinyltetramethyltetracyclosiloxane, tetravinyldimethyldisiloxane, trialkyl cyanurates, alkyl maleates such as diallyl maleate, dimethyl maleate and diethyl maleate, alkyl fumarates such as diallyl fumarate and diethyl fumarate, organic hydroperoxides such as cumene hydroperoxide, tert-butyl hydroperoxide and pinane hydroperoxide, organic peroxides, organic sulfoxides, organic amines, diamines and amides, phosphines and phosphites, nitriles, triazoles, diaziridines, and oximes.

The inhibitor content of the compositions is preferably from 0 to 50,000 ppm, more preferably from 50 to 2000 ppm, and most preferably from 100 to 800 ppm.

Examples of fillers are those indicated above in connection with the condensation-crosslinkable compositions. If fillers are employed, their amounts are preferably from 2 to 100 parts by weight, more preferably from 5 to 60 parts by weight, in each case based on 100 parts by weight of component (1).

The compositions may, if necessary, be dissolved, dispersed, suspended or emulsified in liquids. The compositions may, in particular depending on the viscosity of the constituents and the filler content, have a low viscosity and thus be pourable, may have a pasty consistency, may be pulverulent, or alternatively, may be soft, high-viscosity compositions, such as are known by those skilled in the art as RTV-1, RTV-2, LSR and HTV compositions. In particular, the compositions according to the invention may be prepared in the form of granules, if of high viscosity.

The addition-curable organopolysiloxane compositions can be prepared by known processes, for example by homogeneous mixing of the individual components. Components (1) to (6) may be a single type of such a component or alternatively may be a mixture of at least two different types of such a component. The addition crosslinkable compositions preferably comprise no further substances besides components (1) to (6).

The addition crosslinkable compositions can be crosslinked under conditions conventional for compositions which can be crosslinked by hydrosilylation. These conditions are preferably temperatures of from 100 to 220° C., more preferably from 130 to 190° C., and a pressure of from 900 to 1100 hPa. However, it is also possible to use higher or lower temperatures and/or pressures.

The compositions of the invention and the crosslinked products produced therefrom can be employed for all purposes for which organopolysiloxane compositions which can be crosslinked to give elastomers or the elastomers prepared therefrom have hitherto been used, including, in particular, silicone coating or impregnation of any desired substrates, production of moldings, for example by injection molding, vacuum extrusion, extrusion, casting and compression molding, and the production of castings which are used as sealants, embedding compositions and encapsulation compositions, etc.

The organosilicon compound-based compositions can also be peroxidically crosslinkable compositions. The peroxidically crosslinkable, organosilicon compound-based compositions according to the invention preferably comprise (A) organosilicon compounds comprising units of the general formula

$$R^5_r SiO_{(4-r)/2} \quad (V)$$

in which
$R^5$ are identical or different and denotes a monovalent, optionally substituted hydrocarbon radical, a hydroxyl radical or an alkoxy radical, and
r is 0, 1, 2 or 3 and has an average numerical value of from 1.9 to 2.1,
(B) an agent which effects crosslinking via free radicals,
(C) glass flakes having a thickness of from 0.1 to 20 μm, a length of from 1 to 5000 μm and a width of from 1 to 5000 μm,
and optionally,
(D) further substances.

Examples of radicals $R^5$ are the examples given above for R. The radical $R^5$ is preferably a monovalent, optionally substituted hydrocarbon radical having from 1 to 18 carbon atoms, more preferably a monovalent, optionally substituted hydrocarbon radical having from 1 to 8 carbon atoms, in particular the methyl, vinyl, phenyl or 3,3,3-trifluoropropyl radical. In all the hydrocarbon radicals heretofore identified as optionally substituted, the substituents are any which do not significantly impair the crosslinking ability of the compositions, for example halo, cyano, alkoxy, etc. Such substituents are well known to those skilled in the art of crosslinkable organosilicon compositions.

The organosilicon compounds (A) are preferably organopolysiloxanes comprising units of the formula (V) in which at least 70% of all radicals $R^5$ are Si-bound alkyl radicals, in particular methyl radicals, where the units of the formula (V) are preferably diorganosiloxane units.

The end groups of the organosilicon compounds (A) can be trialkylsiloxy groups, in particular the trimethylsiloxy radical or the dimethylvinylsiloxy radical; however, it is also possible for one or more of these alkyl groups to be replaced by hydroxyl groups or by alkoxy groups such as methoxy or ethoxy radicals.

The organosilicon compounds (A) can be liquids or high-viscosity substances. The organosilicon compounds (A) preferably have a viscosity at 25° C. of between $10^3$ and $10^8$ mm²/s.

Component (B) can be an agent which generally initiates or effects crosslinking via free radicals and which has also been employed hitherto in peroxidically crosslinkable compositions, preference being given to peroxides, in particular organic peroxides.

Examples of organic peroxides of this type are peroxyketals, for example 1,1-bis(tert-butylperoxy)-3,3,5-trimethylcyclohexane and 2,2-bis(tert-butylperoxy)butane; diacyl peroxides such as acetyl peroxide, isobutyl peroxide, and dibenzoyl peroxide; dialkyl peroxides such as di-tert-butyl peroxide, tert-butylcumyl peroxide, dicumyl peroxide, 2,5-dimethyl-2,5-di(tert-butylperoxy)hexane, and bis(2,4-dichlorobenzoyl)peroxide; and peresters such as tert-butyl peroxyisopropylcarbonate.

The peroxidically crosslinkable organopolysiloxane compositions preferably comprise component (B) in amounts of from 0.4 to 2.0 percent by weight, more preferably from 0.7 to 1.5 percent by weight, in each case based on the total weight of the peroxidically crosslinkable composition.

Glass flakes (C) which can be employed in accordance with the invention are preferably used in an amount of from 2 to 100 parts by weight per 100 parts by weight of peroxidically crosslinkable composition.

In accordance with the particular application, further substances (D) can be added to the compositions according to the invention which can be vulcanized to give elastomers, with the proviso that the additives (D) are different from component (C). Examples of further substances (D) of this type are fillers, plasticizers, pigments and stabilizers, such as, for example, heat stabilizers. Examples of reinforcing and non-reinforcing fillers are the examples of fillers indicated above in connection with condensation-crosslinkable compositions.

If the peroxidically crosslinkable compositions comprise a filler as component (D), the amounts are preferably from 1 to 200 parts by weight, particularly preferably from 30 to 100 parts by weight, in each case based on 100 parts by weight of organosilicon compound (A).

Examples of plasticizers and heat stabilizers which can be added as component (D) are the examples thereof indicated above.

The peroxidically crosslinkable compositions preferably comprise no further substances in addition to these.

The respective components employed for the preparation of the peroxidically crosslinkable compositions can in each case be a single type of such a component or a mixture of at least two different types of such a component, and can be prepared by known processes, such as simple mixing of the individual components.

The peroxidically crosslinkable compositions can be crosslinked under the same conditions as the previously known peroxidically crosslinkable compositions.

The peroxidically crosslinkable compositions and the elastomers prepared therefrom can be employed for all purposes for which such compositions and elastomers have hitherto been used. In particular, the peroxidically crosslinkable compositions and elastomers are suitable for applications which require improved tear propagation strength, for example, hoses, cable sheaths, motor vehicle parts and seals. The peroxidically crosslinkable compositions are particularly suitable for the production of films by the calendering process, or for application to textile or non-textile sheet-like structures with the aid of a calender or by extrusion from a slot die.

In the following examples, all parts and percentage data are parts and percentage by weight, unless specified otherwise, and are carried out at the pressure of the ambient atmosphere, i.e. at about 1000 hPa, and at room temperature, i.e. at about 20° C., or at a temperature which becomes established without additional heating or cooling when the reactants are combined at room temperature. All viscosity data indicated in the examples are based on a temperature of 25° C.

The tear propagation strength of the vulcanizates is determined in accordance with ASTM D 624 B. The Shore A hardness is determined in accordance with DIN (Deutsche Industrie Norm) 53505-87. Tear strength is determined in accordance with DIN 53504-85S1, and elongation at break is determined in accordance with ASTM D 412. The coefficient of friction is determined in accordance with ASTM D1894, while the calorific value is determined in accordance with DIN 51900.

Glass Flakes Made from Borosilicate Glass

The examples are carried out using borosilicate glass flakes having a particle size distribution of <50 μm (at least 88%), 50–150 μm (up to 10%) and >150 μm (up to 2%) and a glass flake thickness of from 1.9 to 2.5 μm. The glass flakes have not been surface-treated, and the glass has the following composition:

| | |
|---|---|
| $SiO_2$ | 63–70% |
| $Al_2O_3$ | 3–6% |
| CaO | 4–7% |
| MgO | 1–4% |
| $B_2O_3$ | 2–5% |
| $Na_2O$ | 9–12% |
| $K_2O$ | 0–3% |
| $TiO_2$ | 0–4% |
| ZnO | 1–5% |

The glass has a density of 2.60 ($H_2O$=1), a melting point of from 930 to 1020° C. and a softening point of 688° C. (DIN 52324). The glass flakes employed are commercially available under the trade name "ECR Glass Flake Micronised, Grade GF 003" from Glassflake Ltd., Leeds, GB.

COMPARATIVE EXAMPLE 1

120 g of a vinyl-terminated dimethylpolysiloxane having a viscosity of 20,000 mPas and 156 g of a vinyl-terminated dimethylpolysiloxane having a viscosity of 1000 mPas are mixed with 55 g of a highly disperse silicic acid having a BET surface area of 300 g/m². Incorporated into the mixture thus prepared are 0.06 g of platinum/1,3-divinyl-1,1,3,3-tetramethyldisiloxane complex (so-called Karstedt catalyst), 10 g of a methylhydropolysiloxane of the formula $(Me_3SiO)(Me_2SiO)_{-30}(MeHSiO)_{-30}(SiMe_3)$ having a hydrogen content of 0.74% and a viscosity of 65 mm²/s, and 1.5 g of ethynylcyclohexanol. The curable silicone rubber composition obtained in this way is vulcanized for 5 minutes at 150° C.

EXAMPLE 1

40 g of the above-described borosilicate glass flakes are mixed by stirring into 100 g of the silicone rubber composition whose preparation is described in Comparative Example 1. This composition is vulcanized for 5 minutes at 150° C.

Silicone rubbers having the following properties are obtained from Comparative Example 1 and Example 1:

TABLE 1

| | Comparative Example 1 | Example 1 |
|---|---|---|
| Shore A | 42 | 68 |
| Tear strength N/mm² | 2.8 | 4.0 |
| Tear propagation strength N/mm | 3.8 | 8.5 |
| Elongation at break % | 210 | 140 |
| Coefficient of friction | 1.4 | 0.4 |
| Calorific value kJ/g | 24 | 15 |

COMPARATIVE EXAMPLE 2

164 g of a dimethylpolysiloxane terminated at both ends by Si—OH groups and having a viscosity of 80,000 mPas are mixed with 96 g of hydrophobicized, highly disperse silicic acid having a BET surface area of 130 g/m² in a compounder. 103 g of dimethylpolysiloxane terminated at both ends by Si—OH and having a viscosity of 1000 mPas are incorporated into the homogeneous mixture following which 1.5 g of n-propanol, 18.4 g of methyltriacetoxysilane and 0.26 g of dibutyltin diacetate are then added. The curable silicone rubber composition obtained in this way is vulcanized for 48 hours at 25° C. and 50% relative atmospheric humidity.

EXAMPLE 2

In a stirrer, 10 g of the above-described borosilicate glass flakes are mixed into 100 g of the curable silicone rubber composition whose preparation is described in Comparative Example 2. This silicone rubber composition is vulcanized for 48 hours at 25° C. and 50% relative atmospheric humidity.

Silicone rubbers having the following properties are obtained from Comparative Example 2 and Example 2:

TABLE 2

| | Comparative Example 2 | Example 2 |
|---|---|---|
| Shore A | 24 | 31 |
| Tear strength N/mm² | 2.0 | 2.7 |
| Tear propagation strength N/mm | 3.8 | 4.2 |
| Elongation at break % | 280 | 150 |

COMPARATIVE EXAMPLE 3

In a compounder, 728 g of a dimethylpolysiloxane which is vinyl terminated at both ends and has a Brabender plasticity of 5.2 Nm are mixed with 10.9 g of a dimethylpolysiloxane which is terminated at both ends by Si—OH and has a viscosity of 65 mPas, and with 4.3 g of a polysiloxane of the formula $HO[SiO(CH_3)CH=CH_2]_{10}[SiO(CH_3)_2]_{40}OH$, following which 265 g of a highly disperse silicic acid having a BET surface area of 150 g/m² are incorporated into this mixture. Toward the end of the mixing procedure, 8 g of dibenzoyl peroxide are incorporated.

The curable silicone rubber composition obtained in this way is vulcanized for 5 minutes in a compression mold at 165° C.

EXAMPLE 3

In a compounder, 10 g of the above-described borosilicate glass flakes are mixed into 100 g of the silicone rubber composition whose preparation is described in Comparative Example 3. This silicone rubber composition is vulcanized for 5 minutes in a compression mold at 165° C.

Silicone rubbers having the following properties are obtained from Comparative Example 3 and Example 3:

TABLE 3

|  | Comparative Example 3 | Example 3 |
| --- | --- | --- |
| Shore A | 41 | 49 |
| Tear strength N/mm² | 7.5 | 9.7 |
| Tear propagation strength N/mm | 19 | 20 |
| Elongation at break % | 750 | 740 |

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention. Specified otherwise, the terms "a" and "an" in the claims mean "one or more than one."

What is claimed is:

1. A curable composition which cures to an organopolysiloxane elastomer, comprising crosslinkable organosilicon compounds and glass flakes having a thickness of from 0.1 to 20 μm, a length of from 1 to 5000 μm and a width of from 1 to 5000 μm, said glass flakes present in an amount of from 1 to 80 parts by weight relative to 100 parts by weight of crosslinkable organosilicon compounds, and said crosslinkable organosilicon compounds comprising at least one crosslinkable organopolysiloxane,
    wherein when said composition is an addition-crosslinking 2-component silicone rubber composition, said composition comprises components:
    1) organosilicon compounds containing Si—C bound radicals having aliphatic carbon—carbon multiple bonds, said organosilicon compounds containing Si—C bound radicals having aliphatic carbon—carbon multiple bonds consisting essentially of linear and/or branched organopolysiloxanes;
    2) organosilicon compounds containing Si-bound hydrogen atoms,
    3) optionally, in lieu of or in addition to components 1) and 2), organosilicon compounds containing both Si—C bound radicals having aliphatic carbon—carbon unsaturation and Si-bound hydrogen atoms; and
    4) a hydrosilylation catalyst.
2. The curable composition of claim 1, wherein said glass flakes are present in an amount of from 2 parts to 20 parts by weight per 100 parts by weight of said crosslinkable organosilicon compounds.
3. The curable composition of claim 1, wherein the glass flakes have a width or length to thickness ratio in the range from 10:1 to 2000:1.
4. A composition of claim 1, wherein said crosslinkable organosilicon composition is a condensation-crosslinkable composition having a long shelf life in the absence of water, but crosslinks in the presence of water at room temperature by condensation to form an elastomer.
5. A composition as claimed in claim 4, wherein the curable composition comprises
    (a) an organosilicon compound containing groups which are capable of undergoing condensation,
    (b) an organosilicon compound containing at least three Si-bound hydrolyzable radicals,
    (c) a condensation catalyst, and
    (d) glass flakes.
6. The composition of claim 1, wherein said crosslinkable organosilicon compounds comprise an addition-crosslinkable organosilicon composition.
7. The composition of claim 6, wherein the curable composition comprises
    (1) an organosilicon compound which contains SiC-bound radicals having aliphatic carbon—carbon multiple bonds,
    (2) an organosilicon compound containing Si-bound hydrogen atoms,
    (3) instead of (1) and/or (2), or in addition thereto, an organosilicon compound containing SiC-bound radicals having aliphatic carbon—carbon multiple bonds and containing Si-bound hydrogen atoms,
    (4) a catalyst which promotes the addition of Si-bound hydrogen onto an aliphatic multiple bond, and
    (5) glass flakes.
8. The curable composition of claim 1, wherein said crosslinkable organosilicon compounds comprise a peroxidically crosslinkable composition.
9. A composition as claimed in claim 8, wherein the peroxidically crosslinkable composition comprises
    (A) organosilicon compounds comprising units of the general formula $$R^5_r SiO_{(4-r)/2} \qquad (V)$$

in which
R⁵ are identical or different and denote a monovalent, optionally substituted hydrocarbon radical, a hydroxyl radical or an alkoxy radical, and
r is 0, 1, 2 or 3 and has an average numerical value of from 1.9 to 2.1,
    (B) an agent which effects crosslinking via free radicals, and
    (C) glass flakes.
10. A molding produced by crosslinking the composition of claim 1.
11. A molding produced by crosslinking the composition of claim 5.
12. A molding produced by crosslinking the composition of claim 7.
13. A molding produced by crosslinking the composition of claim 9.
14. A textile or non-textile sheet-like structure coated with the composition of claim 1.
15. A textile or non-textile sheet-like structure coated with the composition of claim 5.

16. A textile or non-textile sheet-like structure coated with the composition of claim 7.

17. A textile or non-textile sheet-like structure coated with the composition of claim 9.

18. A curable organopolysiloxane elastomer composition comprising 1) at least one linear or branched siloxane comprising units of the formula $$R^2{}_s R^3{}_t SiO_{(4-s-t)/2} \qquad (III)$$

where $R^2$ are identical or different and denotes an SiC-bound, aliphatically unsaturated hydrocarbon radical, $R^3$ are identical or different and denotes an optionally substituted, SiC-bound, aliphatically saturated hydrocarbon radical, s is 0, 1, 2 or 3, preferably 0, 1 or 2, and t is 0, 1, 2 or 3, with the proviso that the sum of s+t is less than or equal to 3, and at least two radicals $R^2$ are present per molecule;

2) at least one linear, cyclic or branched siloxane comprising units of the formula $$R^4{}_u H_v SiO_{(4-u-v)/2} \qquad (IV)$$

where $R^4$ may be identical or different and is as defined above for $R^3$, u is 0, 1, 2 or 3, and v is 0, 1 or 2, preferably 0 or 1, with the proviso that the sum of u+v is less than or equal to 3, and on average at least two Si-bound hydrogen atoms are present per molecule;

3) a hydrosilylation catalyst; and 4) from 2 to about 60 parts by weight based on 100 parts of compounds 1) through 3) of glass flakes having a thickness of from 1 to 7 μm, a width of 1 to 500 μm, and a length of 1 to 500 μm.

19. The composition of claim 18 wherein $R^2$ is a vinyl radical, each $R^3$ independently is a methyl or phenyl radical, and each $R^4$ independently is a methyl or phenyl radical.

20. The composition of claim 19 wherein all $R^3$ and all $R^4$ are methyl radicals.

\* \* \* \* \*